United States Patent
Zimmer

(10) Patent No.: US 8,935,056 B2
(45) Date of Patent: Jan. 13, 2015

(54) WIPER CONTROLLER

(75) Inventor: Joachim Zimmer, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 13/518,590

(22) PCT Filed: Oct. 25, 2010

(86) PCT No.: PCT/EP2010/066027
§ 371 (c)(1),
(2), (4) Date: Jun. 22, 2012

(87) PCT Pub. No.: WO2011/076460
PCT Pub. Date: Jun. 30, 2011

(65) Prior Publication Data
US 2012/0259518 A1  Oct. 11, 2012

(30) Foreign Application Priority Data
Dec. 22, 2009 (DE) .......................... 10 2009 055 169

(51) Int. Cl.
*B60R 22/00* (2006.01)
*B60K 6/485* (2007.10)
*B60S 1/08* (2006.01)

(52) U.S. Cl.
CPC ........................................ *B60S 1/08* (2013.01)
USPC ........................................ 701/49; 180/65.26

(58) Field of Classification Search
CPC .................................................... B60S 1/0896

USPC .......................... 701/49; 180/65.26; 280/6.12
See application file for complete search history.

(56) References Cited

U.S. PATENT DOCUMENTS

| | | | |
|---|---|---|---|
| 5,086,260 A * | 2/1992 | Ito | 318/266 |
| 5,892,343 A | 4/1999 | Mack et al. | |
| 2002/0000782 A1 | 1/2002 | Zimmer | |
| 2004/0010879 A1 | 1/2004 | Zimmer | |

FOREIGN PATENT DOCUMENTS

| | | | |
|---|---|---|---|
| DE | 19634559 | | 3/1998 |
| FR | 2541639 | * | 8/1984 |

OTHER PUBLICATIONS

PCT/EP2010/066027 International Search Report dated Jan. 28, 2011 (Translation and Original, 6 pages).

* cited by examiner

*Primary Examiner* — Muhammad Shafi
(74) *Attorney, Agent, or Firm* — Michael Best & Friedrich LLP

(57) ABSTRACT

A windshield wiper device comprises a controller, a drive unit and a gear that transmits the movement of the drive unit to a wiper shaft. The controller comprises a comparison unit for determining whether the torque output by the drive unit exceeds the predetermined torque, wherein the predetermined torque depends on the position of the wiper shaft. The wind shield wiper device further comprises a reversing unit for reversing the direction of rotation of the drive unit depending on the result of the comparison unit.

2 Claims, 3 Drawing Sheets

WIPER CONTROLLER

BACKGROUND OF THE INVENTION

Wiper systems such as are used, for example, in motor vehicles have the function of moving wiping blades over a window in order to clear the window of moisture and dirt. The wiping blades usually follow an oscillating movement in a circular segment. If the window is wet and if there are no foreign bodies on the window, only a relatively small drive torque has to be made available by the wiper system. However, occasionally there are obstacles located on the window, such as, for example, compressed snow at one end of the circular segment. In this case, the wiper system has to make available a large drive torque and the loading on the wiper system, which promotes wear, is high.

DE 101 44 985 A1 proposes limiting a drive torque, which is made available by the wiper system, as a function of a position of the wiping blades. As a result, load peaks can be limited and overloading of the wiper system can be avoided.

The invention is based on the object of specifying a controller for a windshield wiping device and a method for controlling a windshield wiping device which can reduce overloading of the windshield wiping device and therefore lengthen a service life of the windshield wiping device.

SUMMARY OF THE INVENTION

The invention is based on a windshield wiping device which comprises a drive device and a gear, wherein the gear transmits the movement of the drive device to a wiper shaft. According to the invention, a predetermined torque which is dependent on the position of the wiper shaft is compared with a torque which is output by the drive device and the direction of rotation of the drive device is reversed as a function of a result of the comparison.

In this way, load peaks acting on the windshield wiping device can be reduced as a function of the position of the wiper shaft. Therefore, in particular a nonuniform transmission characteristic of the gear with respect to a position of the wiper shaft can be taken into account during the reduction of the load peaks. By reversing the direction of rotation, areas in which obstacles are present are excluded from the wiping process, said areas increasing the loading on the windshield wiping device to a particularly high degree owing to the nonuniform transmission characteristic. The controller can also advantageously be used for windshield wiping devices having a gear with a uniform transmission characteristic. By reversing the direction of rotation, it is possible to reduce a time period of a high blocking torque, which can increase the expected service life of the windshield wiping device.

In addition, it is possible to determine whether the torque of the output device exceeds the predetermined torque more often than a predetermined frequency. Random or temporary load peaks do not in this way necessarily give rise to premature reversal of the direction of rotation of the drive device, with the result that an unwiped region is not unnecessarily made smaller. Preferably, a low predetermined frequency is assigned to a high predetermined torque. The entire windshield wiping device can therefore be protected against load peaks, which can lengthen a service life of the windshield wiping device.

Furthermore, it is possible to determine whether the torque of the drive device exceeds the predetermined torque for longer than a predetermined time. In a similar way to that stated above, this can promote reduction of those load peaks which can shorten a service life of the windshield wiping device to a particular degree. A short predetermined time is preferably assigned to a high predetermined torque.

The described procedure can be assisted by the torque which can be output by the drive device being limited to a further predetermined torque which is dependent on the position of the wiper shaft.

This combination permits system loading of the windshield wiping device to be made significantly more uniform as a result of which an overall service life expectation of the windshield wiping device increases and elements of the windshield wiping device can be dimensioned better. In addition, elements can, if appropriate, be given weaker dimensioning without putting at risk a planned service life of the windshield wiping device.

BRIEF DESCRIPTION OF THE DRAWINGS

The invention will be described in more detail below with reference to the appended figures, of which.

DETAILED DESCRIPTION

Figure 1:
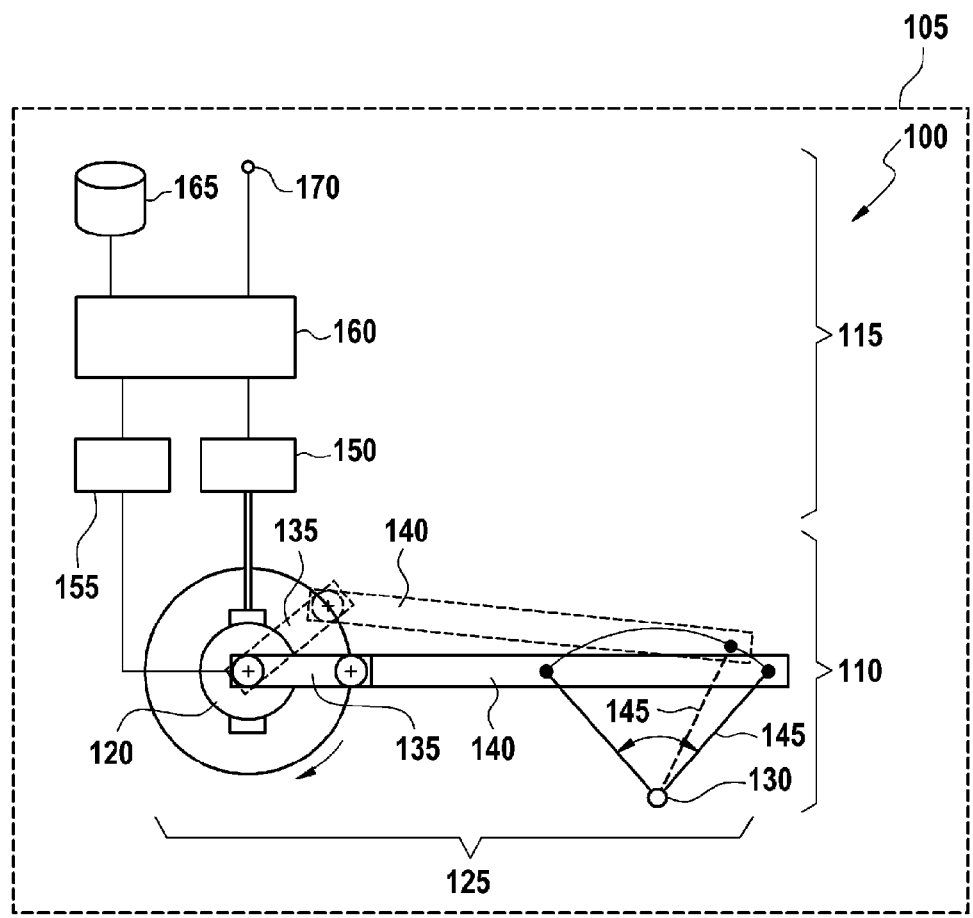
FIG. 1 shows a windshield wiping system.

FIG. 1 shows a windshield wiping system 100 on board a motor vehicle 105. The windshield wiping system 100 comprises a windshield wiping device 110 and a controller 115. The windshield wiping device 110 comprises a drive device 120, a gear 125 and a wiper shaft 130. The gear 125 is formed by a drive crank 135, a linkage 140 and an output lever 145. The gear 125 can have further gear elements, in particular a worm gear (not illustrated) which steps down a rotational movement of the drive device 120 to the drive crank 135.

During operation of the windshield wiping device 110, the drive device 120 turns the drive crank 135, with the result that the pushrod 140 moves the output lever 145 about the wiper shaft 130 in an oscillating fashion in a circular segment. The direction in which the drive crank 135 is turned by the drive device 120 is irrelevant for this activation.

A wiper arm, which is connected to the wiper shaft 130 and guides a wiper blade over a window of the motor vehicle 105, is not illustrated in FIG. 1. The drive crank 135, the linkage 140 and the output crank 145 are illustrated by dashes in a first position. In a second position, the drive crank 135, the linkage 140 and the output lever 145 are illustrated by continuous lines. The second position corresponds to the position of the wiper shaft 130 which is deflected the furthest, at a parked position of the wiper blades. Here, the drive crank 135 and the linkage 140 lie in a line in an extended position. A further extended position is assumed by the gear 125 when the drive crank 135 is turned further through 180° from the first extended position. In the extended positions, the loading of the windshield wiping device and in particular of the gear 125 can be particularly high since a torque which is output by the drive device 120 is transmitted by the gear 125 with a step-down transmission ratio which depends on the position of the drive crank 135.

The controller 115 comprises an actuation means 150 which is connected to the drive device 120, a detector 155 which is connected, for example, to the drive device 120 or the gear 125, a processing device 160, a memory 165 and an interface 170, wherein the processing device 160 is respectively connected to the actuation means 150, the detector 155, the memory 165 and the interface 170. The interface 170 is connected to an operator control element on board the motor vehicle 105, with the result that a driver of the motor vehicle 105 can suitably influence the operation of the controller 115 and/or of the windshield wiper system 100.

Relationships between a position of the drive crank 135 and further parameters at the windshield wiping device 110 are stored in the memory 165, as is explained in more detail below. The detector 155 determines the position of the drive crank 135 and/or of the wiper shaft 130 by, for example, incrementing and respectively decrementing a position counter as a function of a movement of tooth edges of a gear of the drive device 120. In other embodiments, the position of the wiper shaft 130 can also be determined in other ways, for example on the basis of a known movement speed and movement direction of an element of the gear 125 or, for example, by detection by means of a dedicated position sensor instead of the detector 155. A position of the wiper arm or wiper blade can also optionally be determined.

By means of the actuation means 150, the drive device 120 can be actuated to rotate in any desired direction with one of a plurality of predetermined speeds. The drive device 120 is electrically operated and a current which is picked up by it and/or a voltage which is applied are detected in the actuation means 150 and made available to the processing device 160 as a measure of the torque which is output by the drive device 120.

The processing device 160 is designed to actuate the drive device 120 in such a way that load peaks acting on the windshield wiping device 110 are avoided as well as possible without putting the wiping performance of the windshield wiper system 100 at risk.

The torque which is output by the drive device 120 is transmitted by the gear 125 in a nonuniform fashion to the wiper shaft 130. In the case of a constant torque which is output by the drive device 120, the torque which is applied to the wiper shaft 130 is smaller, in the first position of the drive crank 135, linkage 140 and output lever 145 shown by dashed lines, than in the second position of the drive crank 135, linkage 140 and output lever 145 illustrated by continuous lines. This nonuniform transmission of forces, and those positions of the wiper shaft 130 in which there may be high loads acting on the windshield wiping device 110, are to be taken into account in the actuation of the windshield wiping device 110 by the controller 115.

In another embodiment (not illustrated), the gear 125 is composed of elements which permit uniform transmission of the torque which is output by the drive device 120 (direct wiper drive DWD). These elements can comprise, for example, a worm gear. In such an arrangement, the direction of rotation of the drive device 120 is usually reversed, independently of a torque which is output, whenever the wiper shaft 130 has reached an end position of the circular segment. The load acting on the drive device 120 is constant here in all the positions of the wiper shaft 130; nonetheless, when a high load is detected, the time period of the high blocking torque can be reduced by reversing the direction of rotation.

Figure 2:
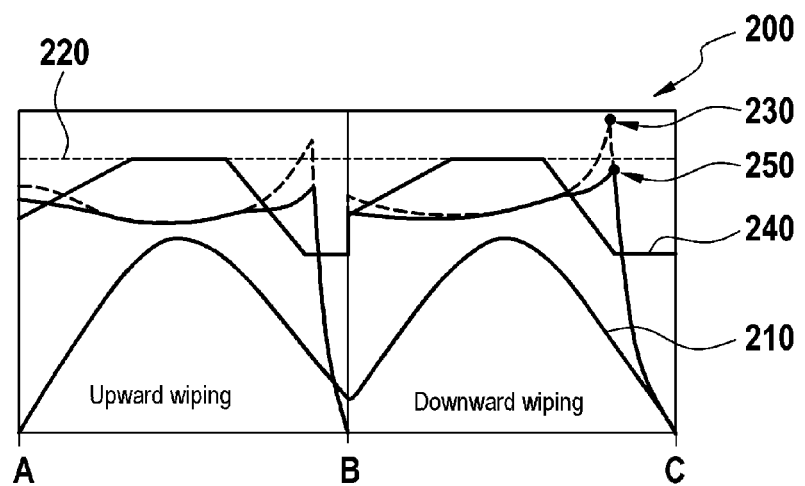
FIG. 2 shows a diagram of force profiles and torque profiles at the windshield wiping device from FIG. 1.

FIG. 2 shows a diagram of force profiles and torque profiles at the windshield wiping device 110 from FIG. 1. A position of the wiper shaft 130 of the windshield wiping device 110 from FIG. 1 is plotted in a horizontal direction. A first position A corresponds to a position in FIG. 1 in which the output lever 145 is in the position shown furthest to the left. A second position B corresponds to the position of the output lever 145 which is illustrated by continuous lines in fig. 1 and is described above as the second position. A third position C in FIG. 2 corresponds to the position A after the output lever 145 has been moved back from its extreme right-hand position into the extreme left-hand position. A direction of rotation of the output lever 145 is insignificant here. In FIG. 2, a torque or a force is plotted in the vertical direction.

In the case of customary operation of the windshield wiping device 110 from FIG. 1, the drive device 120 turns the drive crank 135 at a constant speed in one direction, with the result that the wiper shaft 130 is moved from the position A into the position B and from there into the position C. Since the position C corresponds to the position A, the profile of the positions of the wiper shaft 130 at the position A continues in FIG. 2. Since the gear 125 from FIG. 1 does not transmit uniformly, an angular speed of the wiper shaft 130 and a torque transmitted by the wiper shaft 130 are each dependent on the position of the wiper shaft 130.

A first profile 210 shows a torque requirement of the drive device 120 from FIG. 1. From the position A, the torque requirement 210 rises initially relatively steeply from zero, reaches a local maximum approximately half way between the positions A and B and then drops again severely to the position B, wherein the value reached in the position B is somewhat higher than zero. From the position B, the torque requirement 210 rises strongly again, forms a further local maximum approximately half way between the positions B and C and then drops again severely to the position C until it reaches zero. The profile of the torque requirement 210 of the drive device 120 is mainly due to the nonuniform transmission of forces or torques by the gear 125 illustrated in FIG. 1.

If the torque which is output by the drive device 120 is limited to a constant drive torque 220, a load profile 230 is produced which corresponds to a profile of traction forces and thrust forces in the linkage 140 and is representative of overall loading of the windshield wiping device 110. Traction forces and thrust forces have the same sign in the illustration in FIG. 2. It is clear that the load profile 230 respectively has a particularly high load peak just before the position B or C is reached by the wiper shaft 130. In an actual wiper system 100, this load peak can occur approximately 20°-30° before the position B or C is reached by the wiper shaft 130.

These load peaks can be additionally amplified if, for example, accumulations occur in the region of the turning points of a wiper blade which is moved by means of the wiper shaft 130 in an oscillating movement over a circular segment of a window of the motor vehicle 105. Such accumulations may be formed, for example, by wet foliage or by snow or ice. After the load peak has been reached, the load profile 230 respectively drops to a value near to or equal to zero.

As is generally known, material-induced wear on machine elements can be found to be increased, in particular, when large load peaks have to be processed. Even relatively moderate limitation of such load peaks can lengthen the service life of the element drastically, with the result that the relatively low loading can be performed very much more frequently by the machine element before the machine element becomes worn.

By using an adaptive motor torque a torque, which can be output by the drive device 120 can, for example, be limited to the profile 240. The profile 240 is composed of a plurality of linear segments and is above the profile 210 of the torque requirement of the drive device 120. The profile 240 results in a load profile 250 in the windshield wiping device 110 corresponding to the load profile 230 described above, for the case of a constant motor torque 220. The load peak before the positions B and C are reached by the wiper shaft 130 is significantly reduced and a relatively high load in the region just after the position A or B is exited is also decreased.

Figure 3:
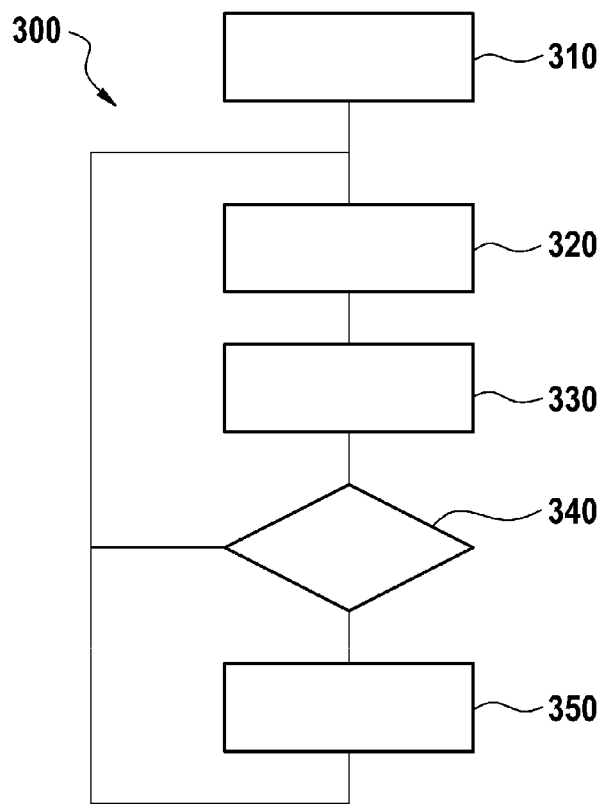
FIG. 3 shows a flowchart of a method for controlling the windshield wiping device from FIG. 1.

FIG. 3 shows a flowchart of a method 300 on the windshield wiping device 110 from FIG. 1. The method 300 can be carried out, for example, by the controller 115 from FIG. 1.

The method 300 comprises steps 310 to 350.

In the first step 310, the method 300 is in the starting state. In the subsequent step 320, a predetermined torque is determined as a function of a position of the wiper shaft 130. For this purpose, a position of the wiper shaft 130 can be determined, for example by means of the detector 155. A torque which is assigned to the determined position is then retrieved from the memory 165. In the memory 165, there may be tabular or formulaic assignments which can be used to infer the predetermined torque from a determined position of the wiper shaft 130.

In step 330, the torque which is output by the drive device 120 is determined. The torque which is output can be determined, for example, on the basis of electrical power fed to the drive device 120 by the actuation means 150. Other means of determining the torque which is output are also possible, for example on the basis of a voltage fed to the drive device 120 in conjunction with a rotational speed of the drive device 120.

In step 340, the torque which is predetermined is compared with the torque which is output. If the torque which is output is lower than or equal to the predetermined torque, the method returns to step 320 and can be run through again. Otherwise, if the torque which is output is higher than the predetermined torque, the direction of rotation of the drive device 120 is reversed in step 350 before the return to step 320. As a result, the positions of the wiper shaft 130 then only run through a smaller angular range than is mechanically possible without a reversal of the direction of rotation. In the probable case of an obstacle in the region of the extreme right-hand and/or extreme left-hand position of the output lever 145 in FIG. 1, the load peaks which are illustrated in FIG. 2 are avoided by the premature reversal of the direction of rotation, wherein the cleaned region of the window of the motor vehicle 105 is reduced on one side or on two sides.

The core of the invention is to perform a reversal of the direction of rotation of the drive device 120 preferably when an additional load acting on the wiper system 100 due to external influences gives rise to particularly large loading on the windshield wiping device 110. In positions of the wiper shaft 130 in which an obstacle involves only moderate additional loading of the windshield wiping device 110, specifically in a central region between the extreme left-hand and the extreme right-hand positions of the output lever 145, a reversal of the direction of rotation is to be avoided in order to optimize the wiping function of the windshield wiper system 100. For this purpose, additional criteria can also be evaluated in step 340 as indicated below.

Figure 4:
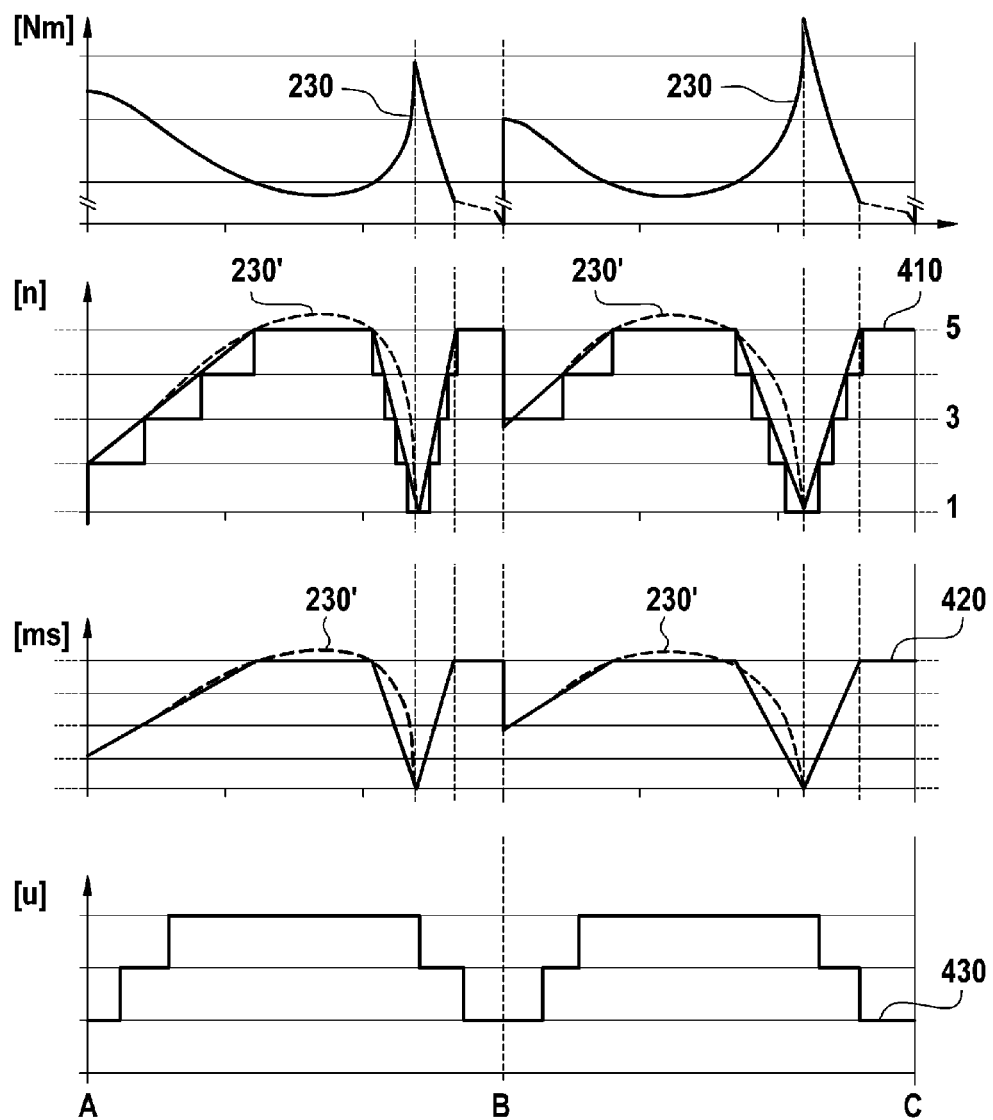
FIG. 4 shows comparison principles for the method from FIG. 3 on the windshield wiping device from FIG. 1.

FIG. 4 shows a diagram 400 of comparison principles for the method 300 from FIG. 3 on the windshield wiping device 110 from FIG. 1.

The diagram 400 corresponds qualitatively to the diagram 200 from FIG. 2. For the purpose of orientation, the load profile 230 is plotted in an upper region of the diagram 400 for a constant motor torque.

A profile 410 shows predetermined frequencies which are used for controlling the reversal of the direction of rotation of the drive device 120, as a function of the position of the wiper shaft 130. The essentially step-shaped frequency profile 410 is oriented toward a profile 230' which arises from the load profile 230 by mirroring at a horizontal axis. In qualitative terms, the frequency profile 410 specifies a high frequency if the load profile 230 indicates a low value, and vice versa. The frequency profile 410 denotes how often a torque which is output by the drive device 120 has to exceed the predetermined torque before a reversal of the direction of rotation is triggered at the corresponding position.

The values which are indicated in FIG. 4 for the frequencies of the frequency profile 410 are exemplary. While the torque which is output by the drive device 120 has to exceed the predetermined torque at least five times in a region approximately in the center between the positions A and B or in the center between the positions B and C in order to bring about a reversal of the direction of rotation of the drive device 120, a single upward transgression is sufficient in the region of the maximum loads of the load profile 230, in each case approximately 30° before the position B or C is reached, in order to bring about a reversal of the direction of rotation.

A further compression time profile 420 which is illustrated in FIG. 4 specifies how long the torque which is output by the drive device 120 has to exceed the predetermined torque for a reversal of the direction of rotation of the drive device 120 to be brought about. The compression time profile 420 is dependent on the position of the wiper shaft 130 and has a segmented linear form in the illustrated example. Since a compression time of the compression time profile 420 can, in contrast to a frequency of the frequency profile 410, also be predefined by non-discrete values, the compression time profile 420 can assume any desired shape, in particular can also completely follow the profile 230'. The selected compression time profile 420 ensures relatively good compression of foreign bodies, which adversely affect movement of the wiper shaft 130, in the region of the extreme left-hand and extreme right-hand positions of the output lever 145, while at the same time load peaks mounting on the windshield wiping device 110 are avoided.

In one embodiment, in addition to the torque profile 240 from FIG. 2, the frequency profile 410 and/or the compression time profile 420 are/is taken into account. A reversal of the direction of rotation of the drive device 120 then occurs if the torque which is output by the drive device 120 exceeds the predefined torque 240 more frequently than is specified by the frequency profile 410 and/or for longer than is specified by the compression time profile 420.

In a lower region of the diagram 400, a frequency profile 430 is shown which can be used for controlling the reversal of a windshield wiping device 110 whose gear 125 ensures uniform transmission of force, for example in a worm gear. Between the positions A and B or B and C, respectively, the frequency profile 430 is respectively symmetrical in the horizontal direction. The frequency profile 430 can otherwise, as stated above, be combined with a corresponding torque profile and optionally additionally combined with a corresponding compression time profile in order to bring about a reversal of the direction of rotation of the drive device 120 used.

The invention claimed is:

1. A controller for a windshield wiping device, wherein the windshield wiping device comprises a drive device and a gear which transmits the movement of the drive device to a wiper shaft, and the controller comprises the following:
    a comparison device configured to determine whether the torque which is output by the drive device exceeds a predetermined torque more often than a predetermined frequency,
    wherein the predetermined torque is dependent on the position of the wiper shaft, and
    a reversing device for reversing the direction of rotation of the drive device as a function of the result of the comparison device.

2. A controller for a windshield wiping device, wherein the windshield wiping device comprises a drive device and a gear which transmits the movement of the drive device to a wiper shaft, and the controller comprises the following:
- a comparison device configured to determine whether the torque which is output by the drive device exceeds a predetermined torque for longer than a predetermined time,
- wherein the predetermined torque is dependent on the position of the wiper shaft, and
- a reversing device for reversing the direction of rotation of the drive device as a function of the result of the comparison device.

* * * * *